US005477536A

United States Patent [19]
Picard

[11] Patent Number: 5,477,536
[45] Date of Patent: Dec. 19, 1995

[54] METHOD AND SYSTEM FOR ROUTING INFORMATION BETWEEN NODES IN A COMMUNICATION NETWORK

[76] Inventor: Jean L. Picard, 309 Chemin des Moulieres, 06480 La Colle Sur Loup, France

[21] Appl. No.: 163,106

[22] Filed: Dec. 7, 1993

[30] Foreign Application Priority Data

Jan. 26, 1993 [EP] European Pat. Off. ............... 93480003

[51] Int. Cl.$^6$ ................................................. H04L 12/56
[52] U.S. Cl. .............................. 370/54; 370/58.3; 370/60
[58] Field of Search .............................. 370/54, 60, 94.1, 370/58.1, 58.2, 58.3

[56] References Cited

U.S. PATENT DOCUMENTS

| | | | |
|---|---|---|---|
| 4,939,726 | 7/1990 | Flammer et al. | 370/94.1 |
| 4,993,018 | 2/1991 | Hajikano et al. | 370/60 |
| 5,115,433 | 5/1992 | Baran et al. | 370/94.1 X |
| 5,309,433 | 5/1994 | Cidon et al. | 370/60 |
| 5,367,518 | 11/1994 | Newman | 370/54 |

FOREIGN PATENT DOCUMENTS

| | | | |
|---|---|---|---|
| 0377360 | 7/1990 | European Pat. Off. | H04L 12/56 |
| 8400266 | 1/1984 | WIPO | H04L 11/20 |
| 9205648 | 4/1992 | WIPO | H04L 12/56 |

*Primary Examiner*—Douglas W. Olms
*Assistant Examiner*—Russell W. Blum
*Attorney, Agent, or Firm*—Joscelyn G. Cockburn

[57] ABSTRACT

A method and apparatus for routing packets through a multinode communication network includes a packet format with a sub-field in which a routing list (RL) having entry addresses and exit addresses for ports of nodes, through which the packet must be routed. Each node on receiving a packet, extracts routing information specific to the node and forwards the packet according to the extracted routing information.

23 Claims, 11 Drawing Sheets

NODE

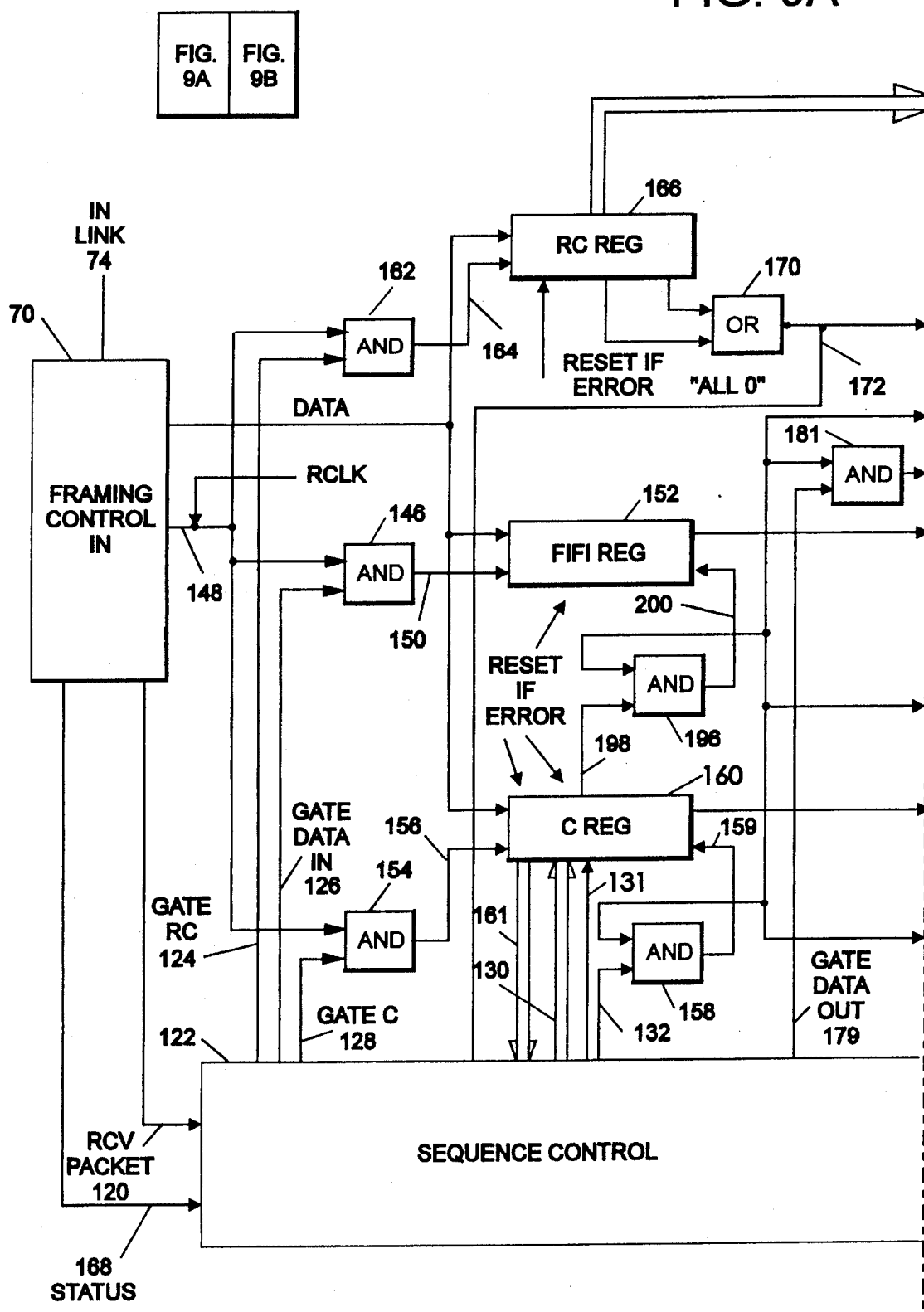

METHOD AND SYSTEM FOR ROUTING INFORMATION BETWEEN NODES IN A COMMUNICATION NETWORK

DESCRIPTION OF THE INVENTION

1. Technical field

The present invention relates to communication networks and more particularly to a method and a system for routing information between network nodes, which allow fast packet switches to be implemented and provide for network management facilities.

2. Background art

One of the basic functions implemented in each node of a communication network is routing of the information packets. Routing consists in finding the physical address of the communication link, on which a packet should be forwarded out of specific pieces of control information contained in the packet. Conventional routing methods are based on routing tables located in each node of a communication network, providing the physical address of the node output port to be used by a node input packet. Using such tables leads to a processing overhead which limits the throughput in network nodes. This drawback is eliminated by using routing techniques known as "self routing packets" in which the packets contain a list of the physical port address to be used by the successive nodes for switching the packets in order to route said packets within the network.

As a packet progresses toward its destination node, each intermediate node reads the output port address to which the packet should be routed, at the beginning of the packet and deletes the port address which has been used within the node prior to transmitting the packet to the next node, as shown in FIG. 1.

This allows high throughputs to be obtained. However intermediate nodes have no means to send notifications to the originator node of a packet in case of abnormal conditions (congestion, port outage, etc..)

SUMMARY OF THE INVENTION

An object of the present invention is to provide a method and a system for routing packets in a node of a communication network in which routing of a packet on a given route can be performed either in the forward or backward direction, thereby allowing the node to react on the originator node of the packet.

Another object of the present invention is to provide such a method and system in which the routing information is kept as compact as possible by means of a specific coding which optimizes the number of bits necessary for routing the packets.

Another object of the present invention is to provide such a method and system allowing a node in the network to be able to contact and identify the neighboring nodes without any prior knowledge of the communication network topology.

The method according to the present invention is used for routing packets from a first end node to a second end node in a communication network comprising a plurality of nodes having input/output ports, through which the packets are routed, and means for establishing a route to be followed by the packets sent from the first end node to the second end node, thereby identifying the nodes to be passed by the packets and in each node the ports through which the packets will enter the node and exit it, said input/output ports having port addresses. The method comprises the following steps:

a) for each node, combining by the means for establishing the route the port addresses of the node input port and node output port in order to obtain a routing code which is specific to the node, and arranging the routing codes obtained for the successive nodes of the route into a routing code list (RL), b) transmitting from said first end node each packet including the routing list, c) receiving the packets at each node of the route and extracting from the routing list the routing code specific to the node, determining the address of the output port of the node from the routing code and the input port address, and providing the packet to the so-determined output port.

In a preferred embodiment of the method the combining step a) comprises the XORing of the input port address and output port address of each node of the route.

In addition it comprises the steps of associating a direction indicator (F/B) to the routing list and setting said indicator to a first value when the packets are sent in a forward direction from the first end node to the second end node and setting the indicator to a second value when feedback packets are returned in the reverse direction of the route, reading at each node the direction indicator of the packets received at an input port, reading at each node either the first routing code of the routing list if the direction indicator is set to the first value or the last routing code of the list if the direction indicator is set to the second value, XORing the routing code read from the routing list with the address of the input port, thereby obtaining the address of the output port, arranging the routing list by rotating the routing codes either forward if the direction indicator is set to the first value or backward if the direction indicator is set to the second value and passing the packets with the arranged routing list and direction indicator to the next node on the route.

The present invention also relates to an apparatus for implementing the above described method.

BRIEF DESCRIPTION OF THE FIGURES

FIGS. 8, 8A & 8B represent the steps of the routing process implemented by the link adapters.

FIGS. 9, 9A & 9B represent a detailed implementation of a link adapter.

DETAILED DESCRIPTION OF THE INVENTION

Figure 1:
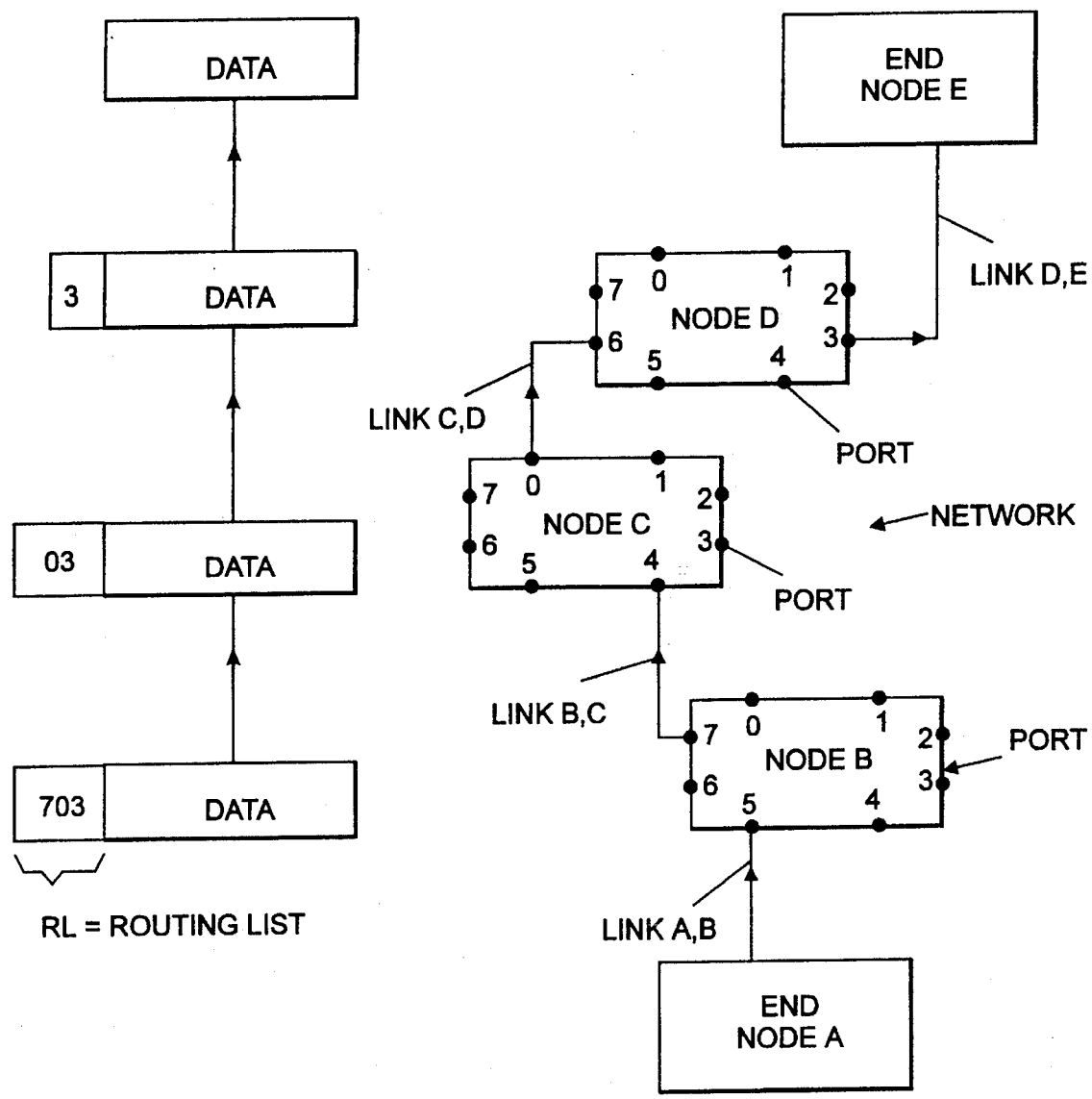
FIG. 1 represents a communication network and the routing lists which are associated to the data on the links between nodes on a route between two end nodes, according to the prior art.

FIG. 1 schematically represents a communication network including several nodes, shown as nodes A, B, C, D, E. Information packets are transported through the network nodes, going from an end node for example A to another end node for example E. The set of links and intermediate nodes included between the two end nodes A and E characterize a specific route. The end nodes are provided with interfaces toward other network nodes referred to as intermediate nodes and interface toward end user terminals.

Each node is provided with input/output ports shown as 0 to 7. Only the input/output ports of the intermediate nodes are shown in FIG. 1.

According to the self routing techniques used in the prior art systems, an information packet transmitted from node A to node E is headed by a routing list RL containing a list of the output port addresses to be used by nodes B,C,D to transport that packet to node E.

As a packet progresses toward its destination, each intermediate node reads the output port address in the RL list at the beginning of the packet, and it deletes the port address which has been used, prior to transmitting that packet to the next node. The prior art packet format is shown in FIG. 1 for each link, A,B; B,C; C,D; D,E, of the route. This routing algorithm is very effective from a performance standpoint, however as explained in the background part of this description, the intermediate nodes have no means to send a notification to the end node originator of a packet, in case of abnormal condition, for instance when there is a port outage or when congestions occur.

Figure 2:
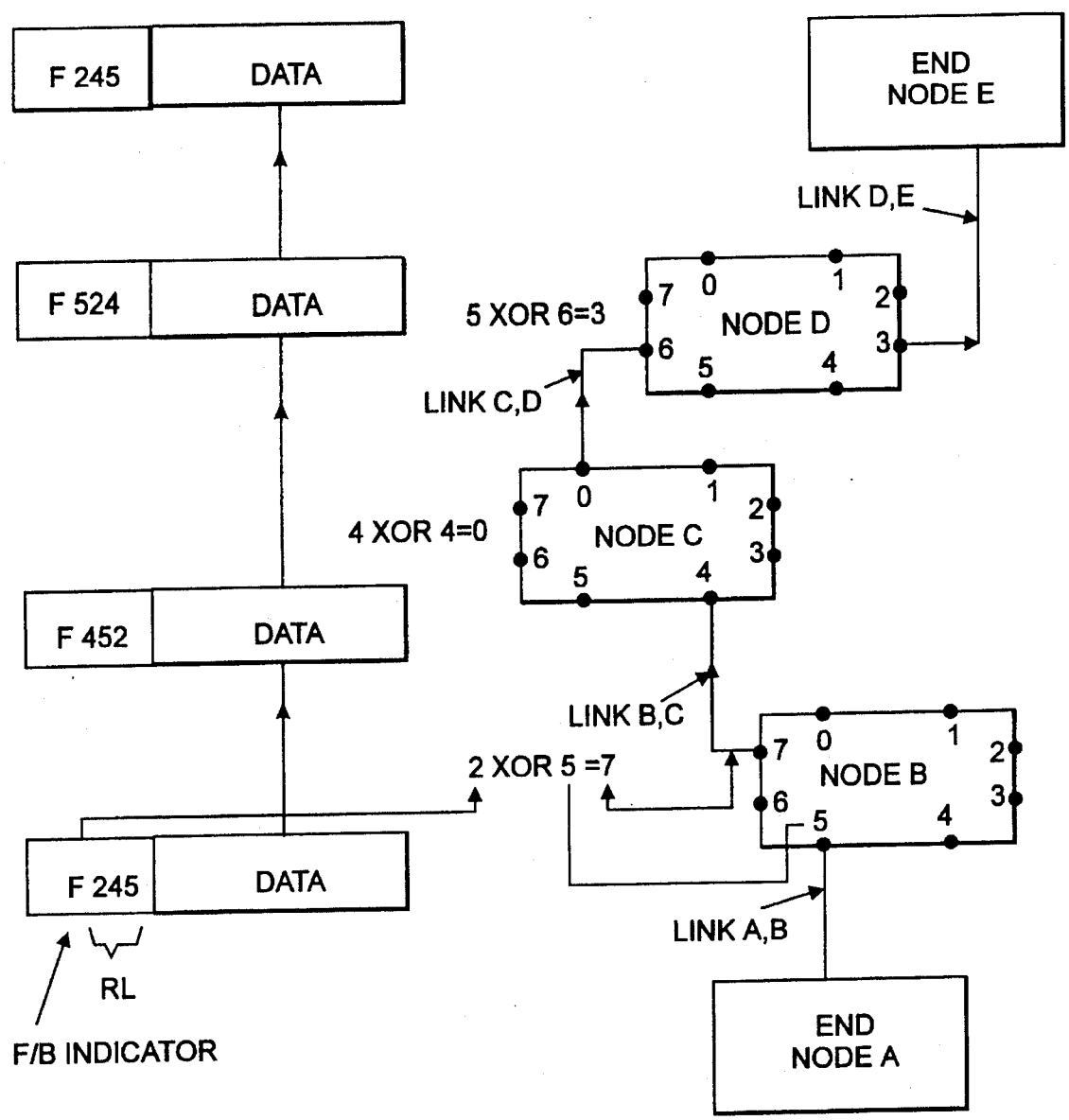
FIG. 2 represents a similar communication network with the routing lists associated to the data according to the subject invention for sending data in the forward direction between two end nodes.
Figure 3:
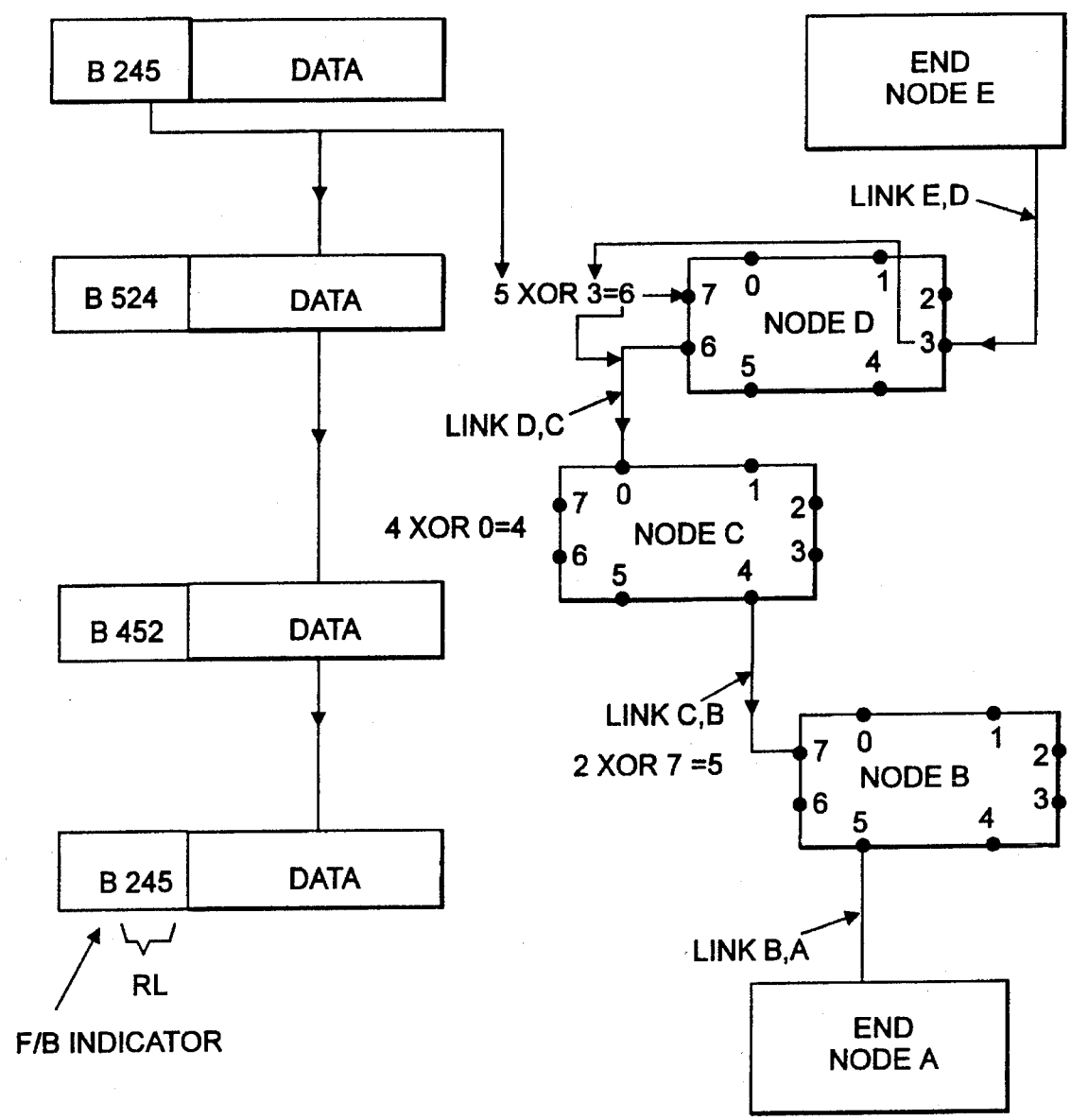
FIG. 3 represents the routing lists associated to the data according to the present invention for sending packets in the backward direction bewteen two end nodes.

FIGS. 2 and 3 show the same network as FIG. 1, with the routing list for routing a packet in the forward and backward direction.

According to the subject invention method, the routing list RL which is associated to the packet is determined as follows:

Considering that a node knows the input port address IPA from which a packet was received, the most condensed form of coding the routing list enabling a node to determine the output port OPA to which the packet should be routed is to build for each traversed node a routing code RC to be included in the routing list, such code being a combination of the input port and output port addresses of the node. The simplest combination consists in XORing the input and output port addresses such that:

RC=IPA (+) OPA, where (+) represents the XOR operator, The number of bits required is not increased with respect to the prior art. There is now a symmetry in the code since swapping IPA and OPA does not change the value of RC. If a node knows both RC and either the input or output port address, it finds the other port address by performing a XOR operation:

OPA=RC(+)IPA

IPA=RC(+)OPA

The same RC list can therefore be used for routing a packet in both directions of a route.

Considering that RC is obtained by XORing two different codes, RC is never equal to 0. As an added benefit, this coding scheme offers an extra code point for free. A network node always include management services, there will be packets destined to this function in the node itself. The RC code 0, can therefore be assigned to that purpose, without introducing restrictions. The routing codes included in the list in the header of the data packet transported on link A,B; B,C; C,D; D,E are shown in FIG. 2.

In node B, IPA=5 and OPA=7, when expressed in decimal
Thus, IPA(+)OPA=101(+)111=010 when expressed in binary
=2 when expressed in decimal
The first RC code in the list on link A,B is 2.
In node C, IPA=4 and OPA=0, thus, IPA(+)OPA=4, which is the second RC code in the list on link A,B.
In node D, IPA=6 and OPA=3, thus IPA(+)OPA=5 which is the third RC code in the list on link A,B.

The routing list is modified in each node in order to enable an intermediate node to retrieve the RC code to be used to route the packet, while keeping all the routing information contained in the packet header.

This is achieved by rotating the routing list containing the RC codes which are needed on a given route.

A forward/backward indicator F/B, is located in a control field ahead of the routing list. It is used to make the routing process completely symmetric. If this indicator is set to a first value, for example F/B=1 indicative that the packet is sent in the forward direction from A to E, an intermediate node reads the RC code at the beginning of the list, and it rotates the routing list so that the next node on the route will also find its RC code at the beginning of the routing list. FIG. 2 shows the routing list on link B,C is 4,5,2, on link C,D it is 5,4,2 and on link D,E it is 2,4,5.

If the F/B indicator is set to the second value, for example F/B=0 an intermediate node reads the RC at the end of the routing list and it rotates the routing list so that the next node will find its RC at the end of the routing list.

This allows an end node for example node E, to respond to a packet by using the same routing list, except for the F/B indicator which needs to be changed to the opposite value. An intermediate node can also send a notification back to the originator of a packet in the same way.

FIG. 2 shows a packet sent from node A to node E. Node B receives this packet through input port P5, IPA=5 that is 101 in binary code. The forward/backward indicator F/B being set to 1, it selects the RC at the-beginning of the routing list. It first checks if RC=0, in which case the destination would be node B itself. If the RC is not 0, which is the case in the routing list shown in FIG. 2, where RC=2 that is the binary code 010, the RC=2 is XORed with IPA=5, which give OPA=101(+)010=111, that is port 7.

A forward rotation of the routing list is performed prior to sending the packet to node C. The same operations take place in node C and D.

FIG. 3 shows a packet sent as a response from end node E to end node A. The same routing information is re-used except for the indicator F/B that is turned into 0. Node D selects its routing code at the end of the routing list which is rotated backward prior to sending the packet to the next node.

Figure 4:
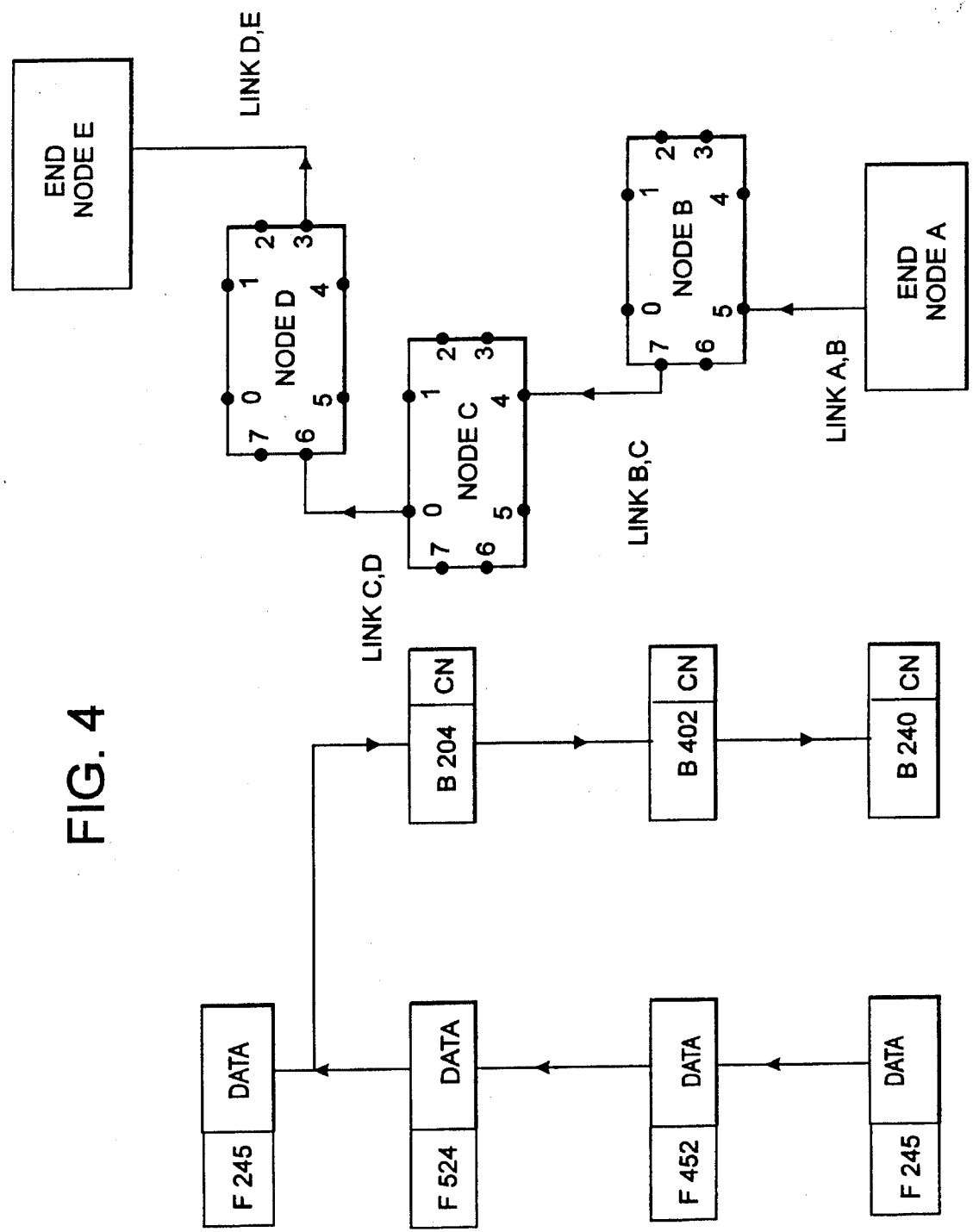
FIG. 4 represents the routing lists associated to the data according to the present invention for sending a congestion notification packet.

FIG. 4 illustrates how a congestion notification is sent by node D to end node A as a result of an excessive queue length at port 3 of node D. Such a notification CN in the data part of the packet is generated by node D. However if this notification did not reach end node A, but instead got sent back either by node B or node C because of a failure, it would end up in end node E. In order to prevent this situation from happening, node D blanks its RC in the notification packet. In case of non delivery, this notification will end up in the management services of Node D where it can be logged. The mechanism allowing an intermediate node to generate a notification can be used for other purposes. It can be used to trace the progression of a packet though the network, to send an outage notification to an end node or to wrap test messages around.

Figure 5:
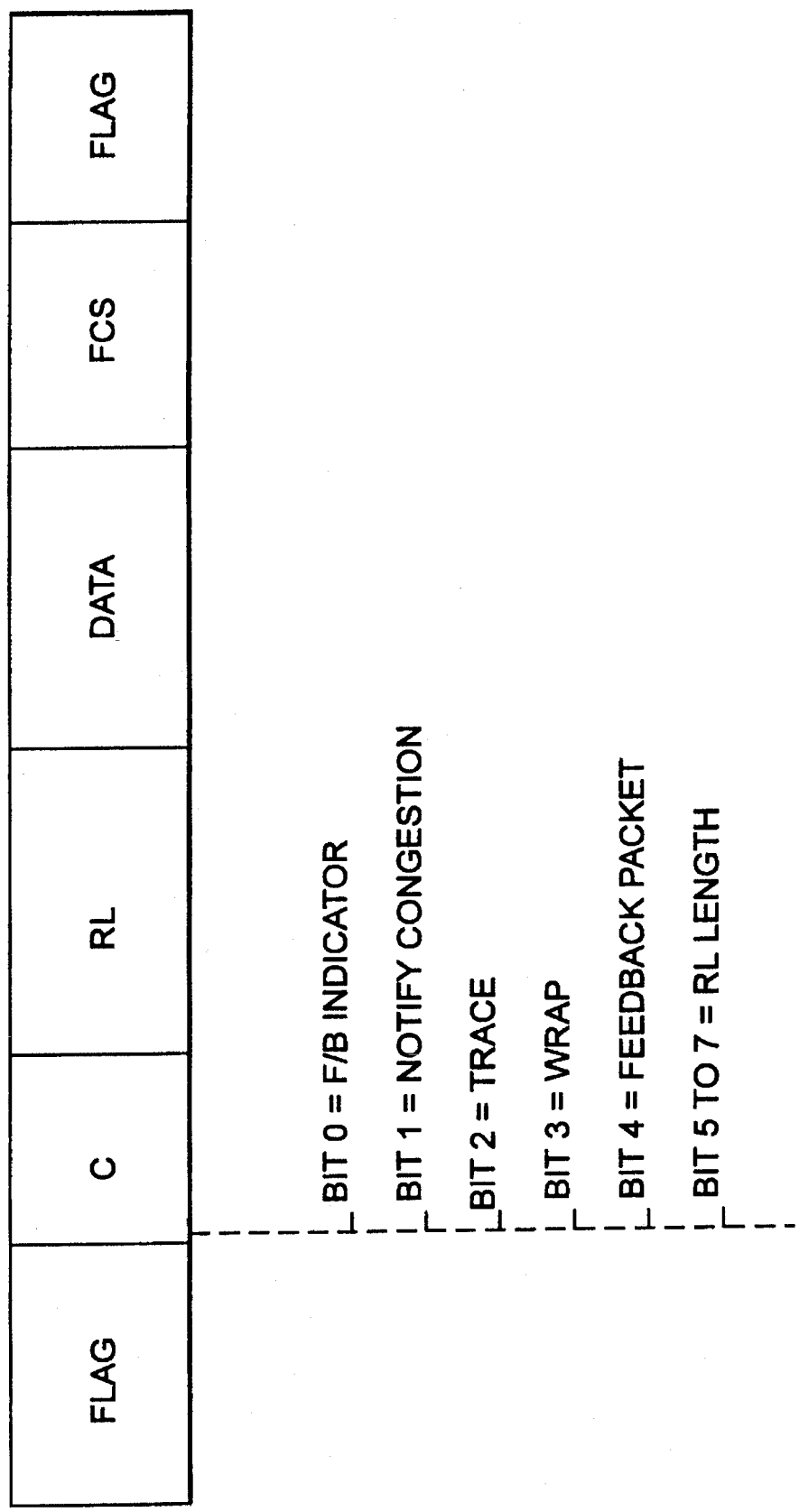
FIG. 5 represents the format of the packets.

In a network implementing this invention, the packets contain a control field as shown in FIG. 5, containing 5 different indicators:

Forward/backward F/B
Notify congestion
Trace
Wrap
Feedback
routing list length (3 bits)

An intermediate node may return a congestion notification to the originator of a packet only if the congestion notification bit is on.

An intermediate node will return a trace notification to the originator of a packet having the trace bit on, when this packet has been successfully routed.

An intermediate node will return a packet, at the level of the link adaptor, if this wrap bit is on and if the Routing code RC in the RL list is equal to 0.

A feedback bit ON indicactor to an end node that this packet was generated by the network.

As usual, the packet is comprised between flags and comprises the RL field, data and frame check sequence FCS fields.

Figure 6:
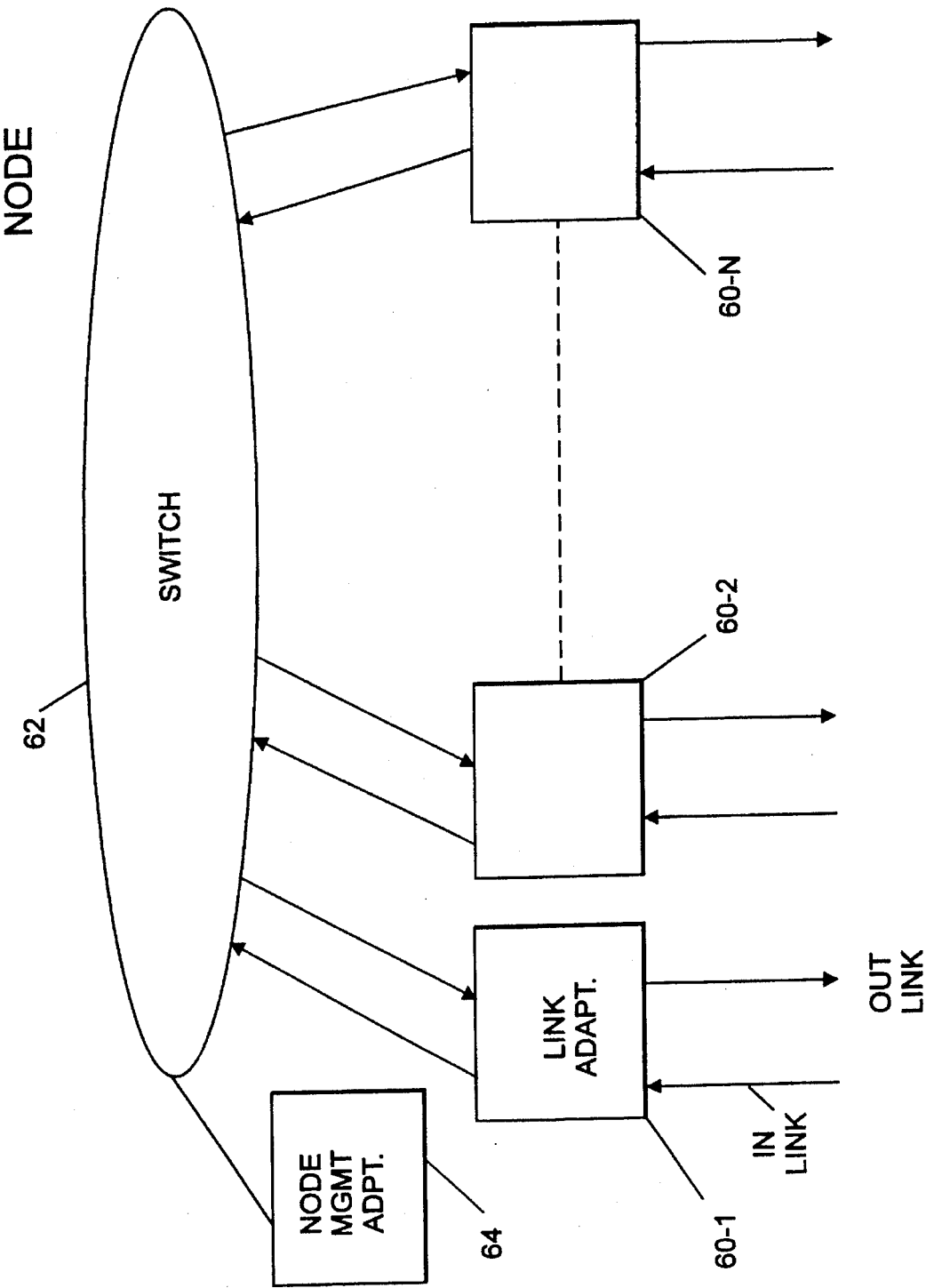
FIG. 6 schematically represents a node of the communication network.

FIG. 6 shows the basic structure of an intermediate node of the network. It is made of a collection of link adapters 60-1 to 60-n interconnected by a switch 62. It also comprises a network management adapter 64. Various kinds of switches can be used in such a node. In this description it will be assumed that the switch is made of a shared bus.

In the end nodes, the network management adapter is responsive to a network access request from one user, to provide the routing list to be appended to the packets for a destination user, as a function of the destination user address.

Figure 7:
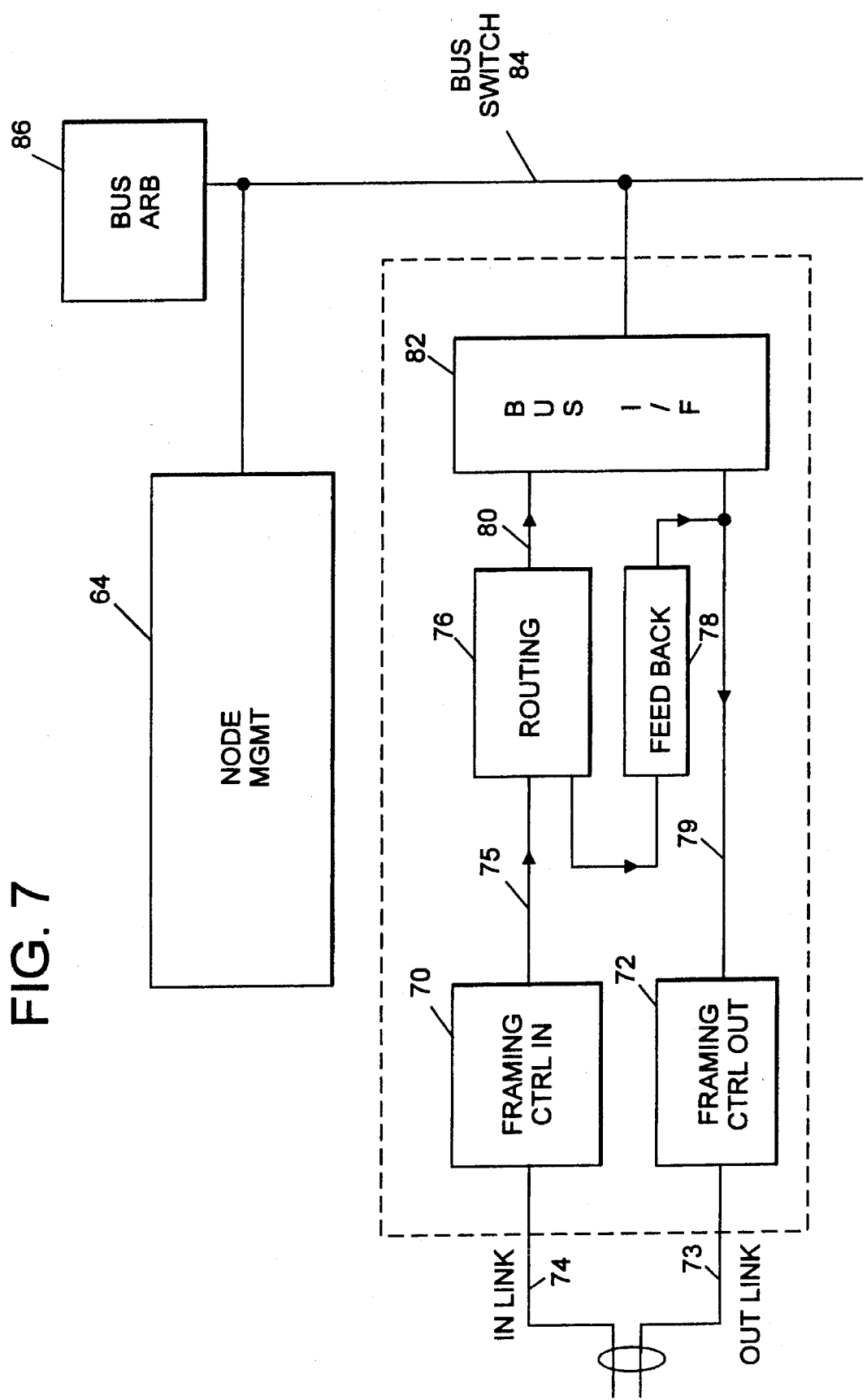
FIG. 7 represents the block diagram of a link adapter of FIG. 6.

FIG. 7 shows the structure of a link adapter. Framing control in and framing control out circuits 70 and 72 perform the usual functions of a link adapter. They deal with the management of the serial bit input flow and output flow on in and out links 74 and 73. These functions are the detection and generation of the frame delimiting flags, insertion/ deletion of zeroes, frame checking. These circuits will not be described in details since they are conventional circuits.

According to the present invention, the link adapter comprises a routing circuit 76, which processes the routing list. It is able to rotate the routing list RL in two ways:

Forward: the bits of the first routing code are moved at the end of the list.

Backward: the bits of the last routing code are moved at the beginning of the list.

Under certain conditions, a packet is fed back toward the source user. This is achieved by the feedback circuit 78, which provides the packet from output link 75 of framing control in circuit 70 on input link 77 of feed back circuit 78, so that the packet is provided on input link 79 of framing control out circuit.

Bus interface circuit 82 is the interface between the link adapter and the bus 84. The bus accesses are managed by bus arbiter 86 which receives the bus requests from the link adapters of the node and grant the bus to a selected adapter, which thus gains access to the bus for sending data packets.

Figure 8A:
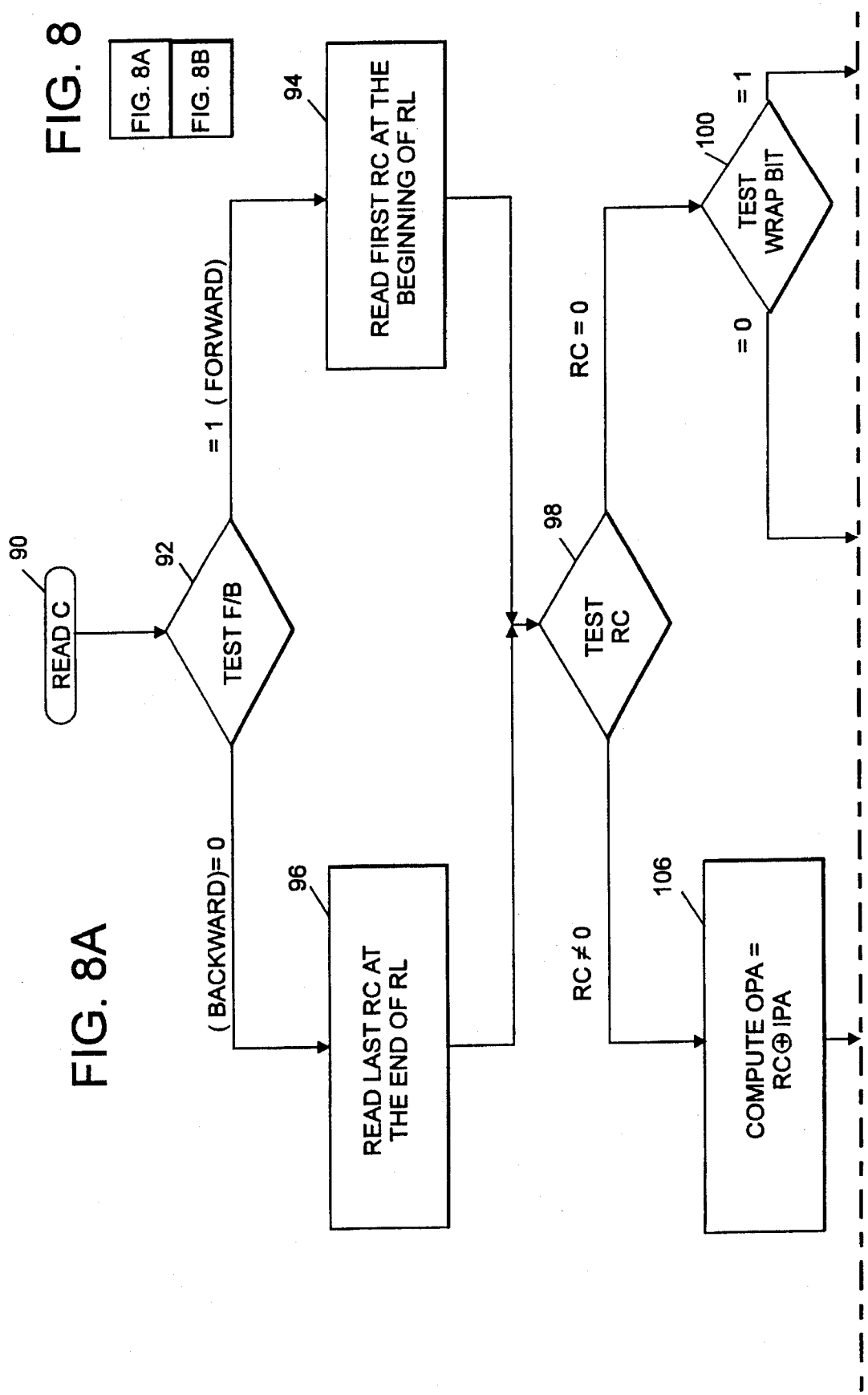
Figure 8B:
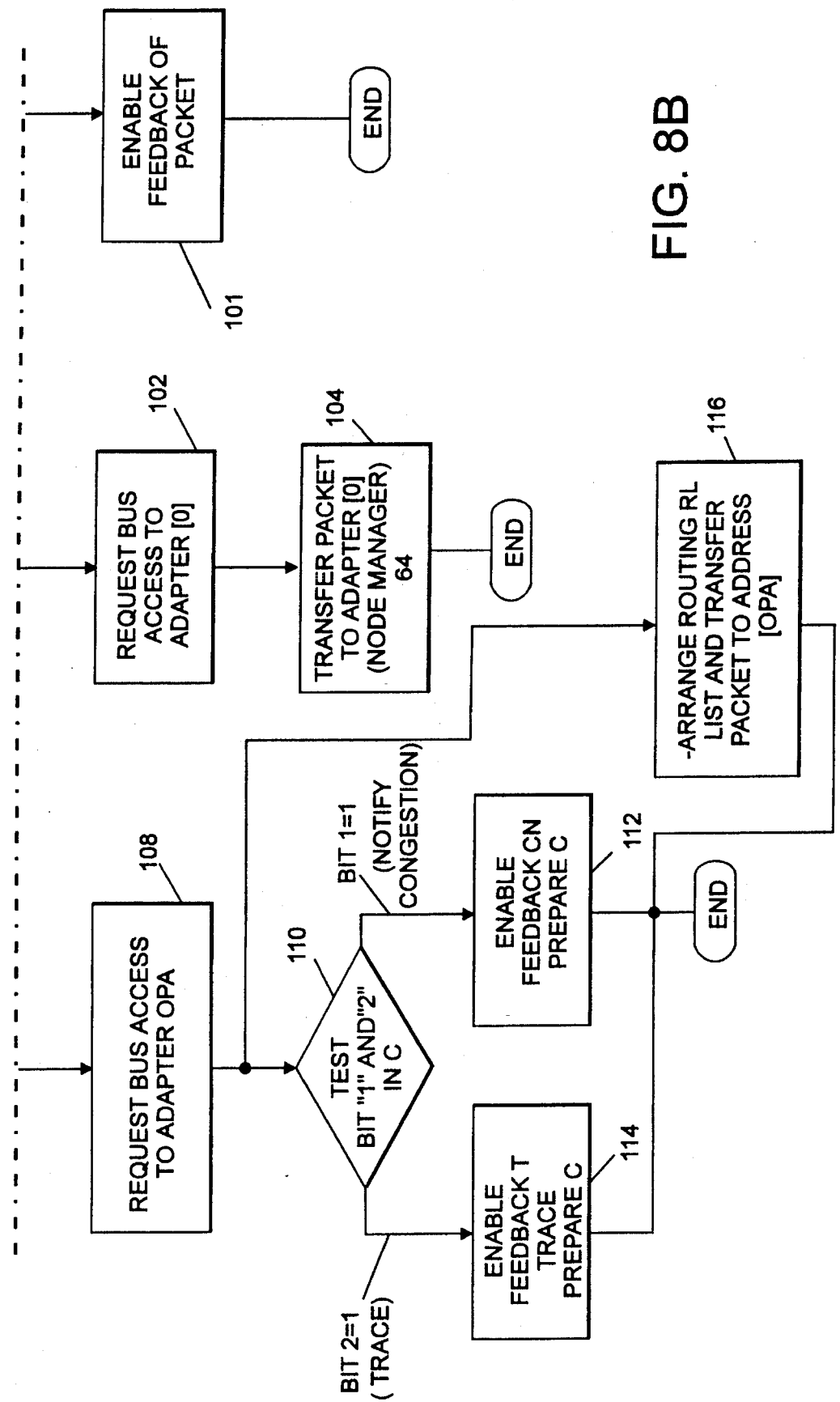

Routing circuit 76 implements the process shown in FIG. 8.

At step 90, routing circuit 76 reads the control field C of the packet. Then, it tests at step 92, the F/B indicator. If this bit is set to 1, (forward), it reads the first RC (Routing code) at the beginning of RL (step 94). If this bit is set to 0 (backward), it reads the last RC at the end of the routing list RL (step 96). Then, it tests (step 98) the RC code. If it is found equal to 0, it tests the wrap bit "3" in the control field at step 100. If this bit is set to 1, it enable the feedback of the packet through circuit 82 (step 101).

If the wrap bit is equal to 0, a request for the bus access is raised to adapter (address 0), i.e. node management adapter 64, at step 102, and then when the bus access is granted it transfers the packet to the node management adapter 64, at step 104.

After steps 101 or 104, the process is ended.

If the RC is different from 0, routing circuit computes OPA at step 106, OPA=RC(+)IPA.

Then, it raises a bus access to adapter with address OPA at step 108. It tests notify congestion bit "1" and Trace bit "2" in the control field at step 110.

The addressed adapter responds with a status indicating whether a congestion exists on this output link. This indication is used to format a feedback packet reporting the congestion situation. If this situation exists and if bit "1" is equal to 1, it enables a feedback congestion notification (step 112).

If bit "2" is equal to 1 it enables a feedback trace (step 114).

When the bus is granted, it arranges the routing list and transfers the packet to adapter with address OPA, step 116.

After steps 114 or 112 and step 116, the process is ended.

Figure 9B:
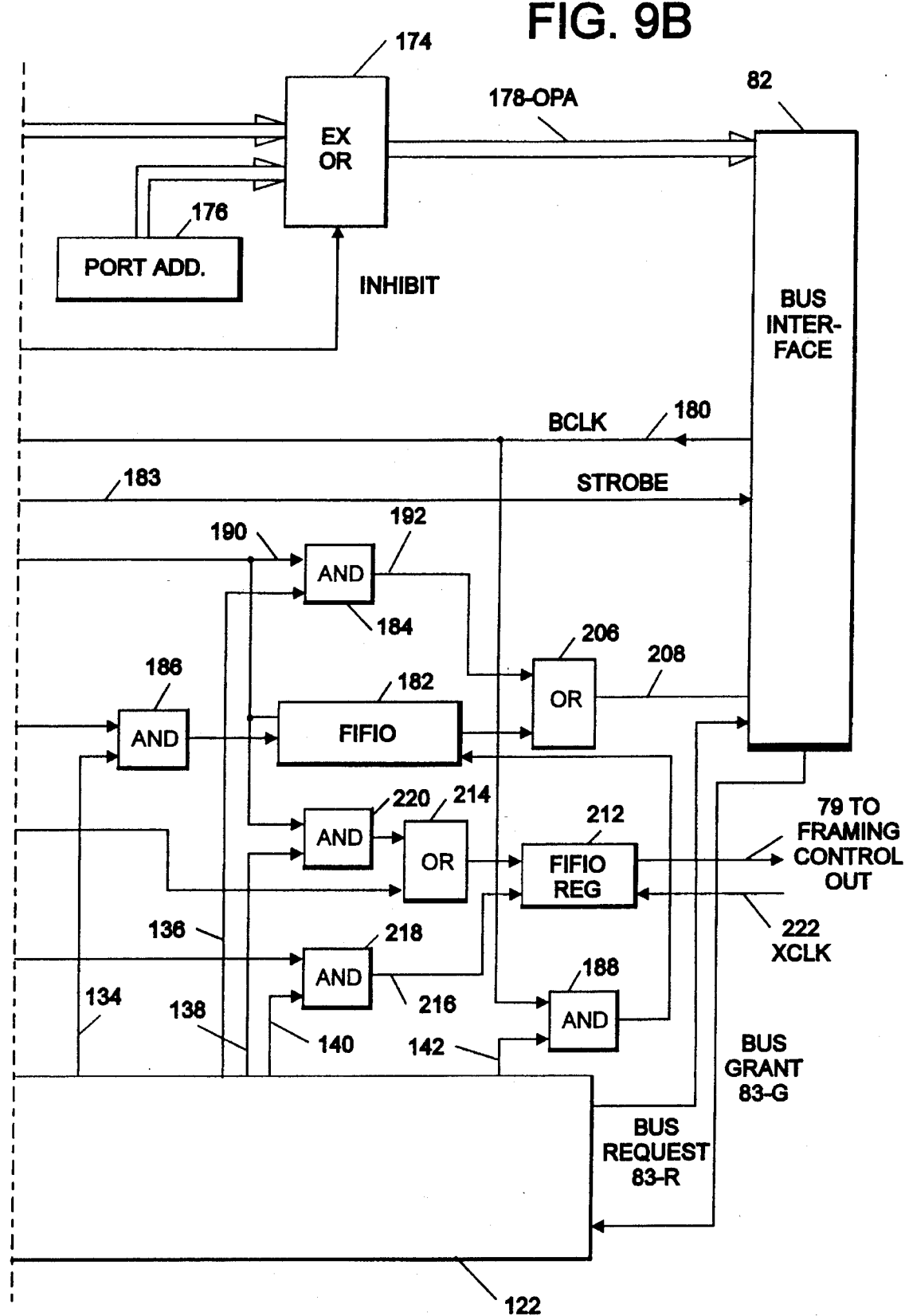

The detailed implementation of the routing circuit 76 and feedback circuit 77 is shown in FIG. 9.

Framing control circuit 70, detects the flags in the received frames and activates RCV packet line 120 when the leading flag of a packet is detected.

Line 120 is provided to a sequence control circuit 122 which generates gating signals on lines 124, 126, 128, 130, 131, 134, 136, 138, 140 and 142, to control the operation of the routing and feedback circuits.

When RCV packet line is activated, line 126 is activated. It is provided to the input of AND gate 146, which receives on another input line 148, a receive clock signal RCLK and provides this signal on its output line 150, to the shift input of a FIFO register 152. As a result the packet bits provided by framing control IN circuit on link 75 to the data input of the FIFO register 152 are inputted in this register under control of the RCLK signal.

RCLK signal on line 148 is also provided to one input of AND gate 154 which receives on another input 128 a gating signal from sequence control circuit 122 during 8-bit clock times of the RCV packet period. This provides the RCLK signal on the shift input 156 of C shift-register 160. The packet bits from link 75 are provided to the data input of C shift-register 160, and thus the C field of the packet is inputted into this register 160.

The C field contents is provided to the sequence control circuit 122, through bus 161. Sequence control circuit 122 tests the various bits in the C field. Thus, it tests the F/B bit indicator, to activate GATE RC line 124 at the right time depending upon the value of this indicator, so as to gate the first RC code in the RL list or the last RC code in the RL list, as described in reference to figure 7.

GATE RC line 124 is provided to one input of AND gate 162, the other input of which is the RCLK line to gate the RCLK signal on its output line 164 to the shift input of RC register 166. The bit packet from link 75 is provided to the data input of RC register 166. Thus, the first RC or last RC code is stored in register 166.

All bits of the received packet, except those of the frame check sequence FCS, are transferred into FIFO register 152. At the end of the packet, RCV packet signal on line 120 is dropped and a status signal is generated on line 168 by the framing control IN circuit 70 and provided to the sequence control circuit 120.

The status signal indicates whether the last received packet is correct or not.

In case the packet contains an error, the registers 152, 160 and 166 are reset and wait for the next packet. If the packet is correct, the routing process takes place.

The contents of register RC is provided to a "all 0" detector 170 which activates its output line 172 when the RC code in register 166 is "all 0" in which case the packet is destined to this node.

Except in the wrap case, an access to the bus is requested by raising request line 83-R.

The OPA address is generated by XOR circuit 174, which provides the XOR function of the RC contents and IPA port address stored in register 176, and generates the OPA address on bus 178 to bus interface circuit 82.

When the connection with the link adapter to which the packet is to be sent is granted, bus interface circuit provides a BUS clock signal on BCLK line 180 and activates grant line 83-G. This clock signal is used to pump the packet including an arranged routing list out of the routing logic.

Arranging the routing list RL is performed by FIFO register 182 by FIFO register 182, according to the value of the F/B bit tested by sequence control circuit 122.

If F/B bit is set to 1, (forward), the first RC bits of the RL list are stored in FIFO register 182 and retrieved after the remaining part of the RL list has been sent to the bus.

This is done by opening sequentially AND gate 184, then AND gate 186, gate 184 again and gate 188 and finally gate 184 until the end of the packet.

AND gate 184 is open by a gating signal from line 136 to gate the contents of FIFO 152 provided from line 190 on output line 192 under control of the BCLK signal which is provided to FIFO register 152 by AND gate 196, when conditioned by a signal from line 198 meaning that the packet is to be sent to interface circuit 82 (no wrap). AND gate 196 provides the BCLK signal on a shift input 200 of FIFO register 152, which causes the bits stored in FIFO 152 to be provided on data output line 190 under control of the BCLK signal.

AND gate 186 gates the BCLK signal from line 180 to FIFO 182 through line 194 at the right time as determined by gating signal from line 134 to copy the RC code determined by the sequence control circuit 122 into FIFO 182 when it is outputted from FIFO register 152 on line 190.

BCLK signal is provided to AND gate 188 and when this gate is open by a signal from line 142, the BCLK is provided to FIFO register 182 to pump the RC bits stored in this register and provide them on data output line 204.

The lines 192 and 204 are provided to OR gate 206 which merges the bit streams from FIFO registers 152 and 182 on its output line 208.

If the code contained in RC register 166 is "all 0" and when no local wrap is requested as indicated by the wrap bit in C register 160, the access to the bus is requested and the packet is provided on line 208 without rotating the routing list. The packet is entirely transferred through gates 184 and OR gate 206. XOR circuit 174 is inhibited, so as to provide a "0" address on bus 178, to route the packet to the node management adapter 64.

The packet bits are provided on line 208, they are accompanied by a strobe signal on line 183 provided by AND gate 181. AND gate 181 is open by a data out gating signal from sequence control circuit 122, on line 179 and gates the BCLK signal from line 180 on strobe line 183.

Any packet sent back to the originator is forwarded through FIFO register 212.

When the decision is made that a feedback packet is to be sent, the feedback packet is generated and the sequence control circuit 122 formats and loads the C field into register 160 through bus 130. The C field is transferred into FIFO register 212 through OR gate 214 and under control of the BCLK signal provided on line 216 through AND gate 218 open by a gating signal on line 140 and under the control of the B clock signal provided to C register 160 through AND gate 158 open by a gating signal on line 132.

Then, the RL code is transferred without rotation from FIFO register 152 into FIFO register 212 through AND gate 220 open by gating signal on line 128, which is used to blank the RC code either at the beginning or at the end of the RL list depending upon the value of the F/B indicator.

Any further status sent after RL is loaded through C register 160. When the framing control out logic is ready to accept the feedback packet for transmission, it provides a transmit clock signal on XCLK line 222, which pumps the feedback packet out of FIFO register 212.

The routing process according to the invention is not based on node addresses. Therefore node addresses do not appear in the subject description. However node addresses are used in a end to end communication protocol between two end nodes. This protocol which is conventional is not described here.

An alternative to the rotation of the routing list would consist in providing an index pointing at the RC that a node must use, this index being incremented or decremented by the routing process.

I claim:

1. A method for routing packets from a first end node to a second end node in a communication network comprising a plurality of nodes having input/output ports, through which the packets are routed and means for establishing a route to be followed by the packets sent from the first end node to the second end node, thereby identifying the nodes to be passed by the packets and in each node the ports through which the packets will enter the node and exit it, said input/output ports having port addresses, said method being characterized in that it comprises the following steps:

a) for each node, combining by the means for establishing the route the port addresses of the node input port and node output port in order to obtain a routing code which is specific to the node, and arranging the routing codes obtained for the successive nodes of the route into a routing code list (RL), b) transmitting from said first end node each packet including the routing list, c) receiving the packets at each node of the route and extracting from the routing list the routing code specific to the node, determining the address of the output port of the node from the routing code and the input port address, and providing the packet to the so-determined output port.

2. The method according to claim 1, characterized in that the combining step a) comprises the XORing of the input port address and output port address of each node of the route.

3. The method according to claim 1 or 2, characterized in that it comprises the step of: associating a direction indicator (F/B) to the routing list and setting said indicator to a first value when the packets are sent in a forward direction from the first end node to the second end node and setting the indicator to a second value when feedback packets are returned in the reverse direction of the route.

4. The method according to claim 3, characterized in that it comprises the steps of:

reading at each node the direction indicator of the packets received at an input port, reading at each node either the first routing code of the routing list if the direction indicator is set to the first value or the last routing code of the list if the direction indicator is set to the second value, XORing the routing code read from the routing list with the address of the input port, thereby obtaining the address of the output port, arranging the routing list by rotating the routing codes forward if the direction indicator is set to the first value or backward if the direction indicator is set to the second value and passing the packets with the arranged routing list and direction indicator to the next node on the route.

5. An apparatus for routing packets from a first end node (A) to a second end node (E) in a communication network comprising a plurality of nodes (A to E) having input/output ports (0 to 7), through which the packets are routed and means (64) for establishing a route to be followed by the packets sent from the first end node to the second end node, thereby identifying the nodes to be passed by the packets and in each node the ports through which the packets will enter the node and exit it, said input/output ports having port addresses; said apparatus being characterized in that:

the means for establishing the route combines for each node of the route the port addresses of the node input port and node output ports for obtaining a routing code (RC) which is specific to the node and arranges the routing codes obtained for the successive nodes of the route into a routing code list (RL), which is provided to the first end node and transmitted with the packets, and in that each node comprises for each input/output port:

receiving means (70) for receiving the packets from the input port, means (122, 162, 166) for reading the routing code specific to the node from the routing list of the packet, combining means (176,174) for combining the read routing code with the address of the node input port for determining the address of the node output port, and transmitting means (152,182, 82) for transmitting the packets to the output port having the address determined by the combining means.

6. The apparatus according to claim 5, characterized in that the routing code specific to each node is obtained by the means for establishing the route by XORing the addresses of the input port and output port.

7. The apparatus according to claim 5 or 6, characterized in that the means for establishing the route associates a direction indicator (F/B) to the routing list, said indicator being set a first value when the packets are sent in a forward direction from the first end node to the second end node and set to a second value when the packets are returned (feedback) to the first end node by a node of the route.

8. The apparatus according to claim 7, characterized in that it further comprises:

means (160) for receiving at each node the direction indicator of the packets received at an input port, means (122, 166) responsive to the value of the direction indicator for reading at each node either the first routing code of the routing list if the direction indicator is set to the first value or the last routing code of the list if the direction indicator is set to the second value, XORing means (174,176) for XORing the routing code read from the routing list with the address of the input port, thereby obtaining the address of the output port, means (182, 122, 184, 186, 188) for arranging the routing list by rotating the routing codes forward if the direction indicator is set to the first value or backward if the direction indicator is set to the second value.

9. The apparatus according to any one of claims 5 to 8 wherein the packet comprises control bits indicative that feedback packets are to be returned by a node and is characterized in that it comprises:

in each node, means (161, 122, 218, 220, 212) for generating the feedback packets, having a direction indicator set to a value opposite to the direction indicator of the forward packets, and having the first routing code in the routing list set equal to a value (all 0) which is different from the combination of input and output addresses, and the other routing codes identical and arranged as the routing codes in the routing list of the forward packets.

10. In a communications network comprising a plurality of interconnected nodes having input/output ports for routing packets of data sent from a first node to a second node with one of the nodes specifying a route including nodes through which the packets are to be transported and output address of exit ports from which the packets exit each node, a method for routing the packets of data comprising the steps of:

generating at a node, wanting to send information, a data packet including a Routing List (RL) containing Routing Codes each one being specific to a node in the route and formed by combining the port addresses of the input port and output port of the node in the route; and forwarding the generated data packet onto the communications network so that other nodes in the route use the Routing Code (RC) to identify node ports whereat the data packet exits a node.

11. The method of claim 10 wherein the combining of port addresses is done by XORing the input port address and the output port address.

12. The method of claim 10 further including receiving the packet at each node of the route and extracting from the Routing List the Routing Code specific to the node;

determining the output port of the node from the Routing Code RC and the input port address; and sending the data packet to the so-determined output port.

13. The method of claim 12 wherein the determining step includes XORing the routing code and the input port address.

14. The method of claim 10 further including the steps of generating a Control Field C having at least one bit for indicating to a node in the route action to be taken relative to the data packet; and concatenating said Control Field to the RL field.

15. The method of claim 14 wherein the Control Field C includes a data byte with bit 0 representing a Forward/Backward (F/B) indicator, bit 1 representing a congestion indicator, bit 2 representing a TRACE indicator, bit 3 representing a WARP indicator, bit 4 representing a Feedback Packet indicator, and bits 5 to 7 representing RL Length indicators.

16. In a communications network comprising a plurality of interconnected nodes having input/output ports for routing packets of data sent from a first node to a second node with one of the nodes specifying a route including nodes through which the packets are to be transported and output address of exit ports from which the packets exit each node, a means for routing the packets of data comprising:

first means for generating, at a node, a data packet including a Routing List (RL) containing Routing Codes each one being specific to a node in the route and formed by means for combining the port addresses of the node input port and the node output port; and second means for forwarding the generated data packet onto the communications network so that other nodes in the route use the Routing Code (RC) to identify node ports whereat the data packet exits a node.

17. The apparatus of claim 16 wherein the combining of port addresses is done by a circuit means for XORing the input port address and output port address.

18. The apparatus of claim 16 further including means for receiving the packet at each node of the route; and means for extracting from the Routing List the Routing Code specific to the node;

means for determining the output port of the node from the Routing Code RC and the input port address; and means for sending the data packet to the so-determined output port.

19. The apparatus of claim 18 wherein the determining means includes a circuit for XORing the routing code and the input port address.

20. A communications network comprising:

a plurality of interconnected nodes having input/output ports for routing packets of data sent from a first node to a second node with one of the nodes specifying a route including nodes through which the packets are to be transported and output address of exit ports from which the packets exit each node;

generating means at a node for generating a data packet including a Routing List (RL) containing Routing Codes each one being specific to a node in the route and formed by means for combining the port addresses of the node input port and the node output port; and means for forwarding the generated data packet onto the communications network so that other nodes in the route use the Routing Code (RC) to identify node ports whereat the data packet exits a node.

21. The apparatus of claim 20 wherein the node includes:

a switch fabric (62);

a plurality of link adapters coupled to the switch fabric; and a node management adapter for managing the node.

22. The node of claim 21 wherein each link adapter includes a framing control IN circuit means for managing a serial bit input data flow;

a framing control OUT circuit means for managing a serial bit output data flow;

a routing circuit means for processing the routing list including rotating said list;

a feedback circuit means coupled to the routing circuit means for feeding back packets from an input link to an output link;

and a bus interface means for interfacing the adapter to the switch fabric.

23. A node adapter comprising:

a framing control IN circuit means for managing a serial bit input data flow;

a framing control OUT circuit means for managing a serial bit output data flow;

a routing circuit means for processing a routing list including rotating said list;

a feedback circuit means coupled to the routing circuit means for feeding back packets from an input link to an output link;

and a bus interface means for interfacing the adapter to the switch fabric.

* * * * *